United States Patent [19]

Meza

[11] Patent Number: 4,524,246
[45] Date of Patent: Jun. 18, 1985

[54] SLIC II—COMMON-MODE CURRENT REJECTION

[75] Inventor: Peter J. Meza, Indian Harbour Beach, Fla.

[73] Assignee: Harris Corporation, Melbourne, Fla.

[21] Appl. No.: 396,072

[22] Filed: Jul. 7, 1982

[51] Int. Cl.³ .......................................... H04M 3/22
[52] U.S. Cl. ................................................ 179/18 FA
[58] Field of Search ........... 179/18 FA, 18 HB, 84 A, 179/84 R, 16 AA, 170 NC

[56] References Cited

U.S. PATENT DOCUMENTS

| | | | |
|---|---|---|---|
| 3,042,816 | 7/1962 | Aagaard | 307/89 |
| 3,783,198 | 1/1974 | Couch | 179/16 AA |
| 4,007,335 | 2/1977 | Hetherington et al. | 179/16 AA |
| 4,020,294 | 4/1977 | Kitajewski et al. | 179/18 FA |
| 4,087,646 | 5/1978 | Brolin et al. | 179/18 FA |
| 4,087,647 | 5/1978 | Embree et al. | 179/77 |
| 4,099,032 | 7/1978 | Roge et al. | 179/18 FA |
| 4,118,597 | 10/1978 | Proctor et al. | 179/18 FA |
| 4,174,467 | 11/1979 | Ferrieu | 179/18 HB |
| 4,178,485 | 12/1979 | Cowpland et al. | 179/18 FA |
| 4,199,664 | 4/1980 | Grangé et al. | 179/18 FA |
| 4,211,896 | 7/1980 | Ferrieu | 179/18 FA |
| 4,234,763 | 11/1980 | Dijkmans et al. | 179/77 |
| 4,275,277 | 6/1981 | Ferrieu | 179/170 NC |
| 4,289,933 | 9/1981 | Henry | 179/18 FA |
| 4,292,473 | 9/1981 | Venken et al. | 179/18 FA |
| 4,306,118 | 12/1981 | Ciboulet et al. | 179/84 A |
| 4,313,034 | 1/1982 | Nijman et al. | 179/16 F |
| 4,356,354 | 10/1982 | Ferrieu | 179/16 AA |
| 4,385,336 | 5/1983 | Takeshita et al. | 361/42 |

FOREIGN PATENT DOCUMENTS

| | | | |
|---|---|---|---|
| 2846882 | 3/1980 | Fed. Rep. of Germany | 179/18 FA |
| 2460078 | 1/1981 | France | 179/16 AA |

OTHER PUBLICATIONS

"Monolithic Subscriber Line Circuit for PABX's", Picard et al., Fourth European Conference on Electrotechnics (Eurocon), Stuttgart, Germany, Mar. 1980, pp. 202-204.

Primary Examiner—Thomas W. Brown
Attorney, Agent, or Firm—Barnes & Thornburg

[57] ABSTRACT

A subscriber line interface circuit using auxiliary current detectors in the legs of a bridge whose input is the subscriber load and a control circuit connected to the auxiliary detectors for determining the polarity of the loop current and insuring that a directional current detector is in a proper mode for detecting the loop current.

8 Claims, 3 Drawing Figures

4,524,246

SLIC II—COMMON-MODE CURRENT REJECTION

BACKGROUND OF THE INVENTION

The present invention relates generally to telephone circuits and, more particularly, to a subscriber circuit which can detect the user going off-hook during ringing even in the presence of high longitudinal current.

Subscriber line interface circuits (SLIC) are well-known in the prior art. These circuits, which serve to connect the subscriber to a telephone exchange, typically include a current detector which performs several functions including detection of the subscriber going off-hook during ringing (ring-trip). In particular, when the subscriber is being called, A.C. ringing signals are applied to the subscriber loop to operate the telephone ringer. When the subscriber goes off-hook, the resulting loop current is detected to interrupt the ringing signals on the loop.

In prior art interface circuits, the current detector can accurately detect the loop current even in the presence of high longitudinal currents. These longitudinal, or common-mode current arises from pair imbalance or the unequal coupling of a noise source into the wires of the pair. The current detector, however, can only detect the loop current if its direction is known. This shortcoming makes the circuit impractical during the ring mode since during this mode the current detector must detect A.C. loop current. If the detector is not in the proper mode; i.e., the direction of the ringing current is unknown, the circuit is unable to detect ring-trip in the presence of high longitudinal currents. Moreover, the polarity of the loop current is not easily determined since distributed capacitance on the line and the inductance of the ringer cause a phase difference between the line voltage and current waveforms. Therefore, there is a need to provide an improved current detector for a SLIC which is always in the proper directional mode to detect the user going off-hook during ringing.

OBJECTS OF THE INVENTION

It is therefore an object of the instant invention to provide a subscriber line interface circuit which can accurately detect the direction of the loop current in the presence of high longitudinal currents.

It is another object of the instant invention to provide a detection circuit to be utilized in a subscriber line interface circuit which responds to true loop current reversals without any external input from the Central Office.

It is yet another object of the present invention to provide a circuit for detecting a user going off-hook during ringing, even in the presence of excessive longitudinal currents, wherein the current detector is internally switched in response to sensing of the magnitude and direction of the loop and longitudinal currents in the circuit.

It is another object of the instant invention to provide an improved current detection scheme for use in currently existing subscriber line interface circuits.

These and other objects are obtained by providing a SLIC having high common-mode current rejection comprising two identical amplifiers connected in parallel to form a bridge circuit, a direction current detector coupled to said bridge circuit for detecting loop current and for suppressing the common-mode current, a plurality of auxiliary current detector means within the bridge circuit for sensing the loop and common-mode currents, and a control circuit means connected to the auxiliary detector means for determining the polarity of the loop current and insuring that the directional current detector is in a proper mode for detecting the loop current.

A method for detection loop current polarity is also provided in a SLIC including a bridge circuit and a directional current detector for detecting the loop current and for suppressing the common mode current; comprising the steps of sensing a current in each leg of the bridge circuit, this current being a function of the loop and common-mode currents, forming a plurality of voltages proportional to the sensed currents and utilizing said plurality of voltages to determine the loop current polarity.

DESCRIPTION OF THE PREFERRED EMBODIMENTS

Figure 1:
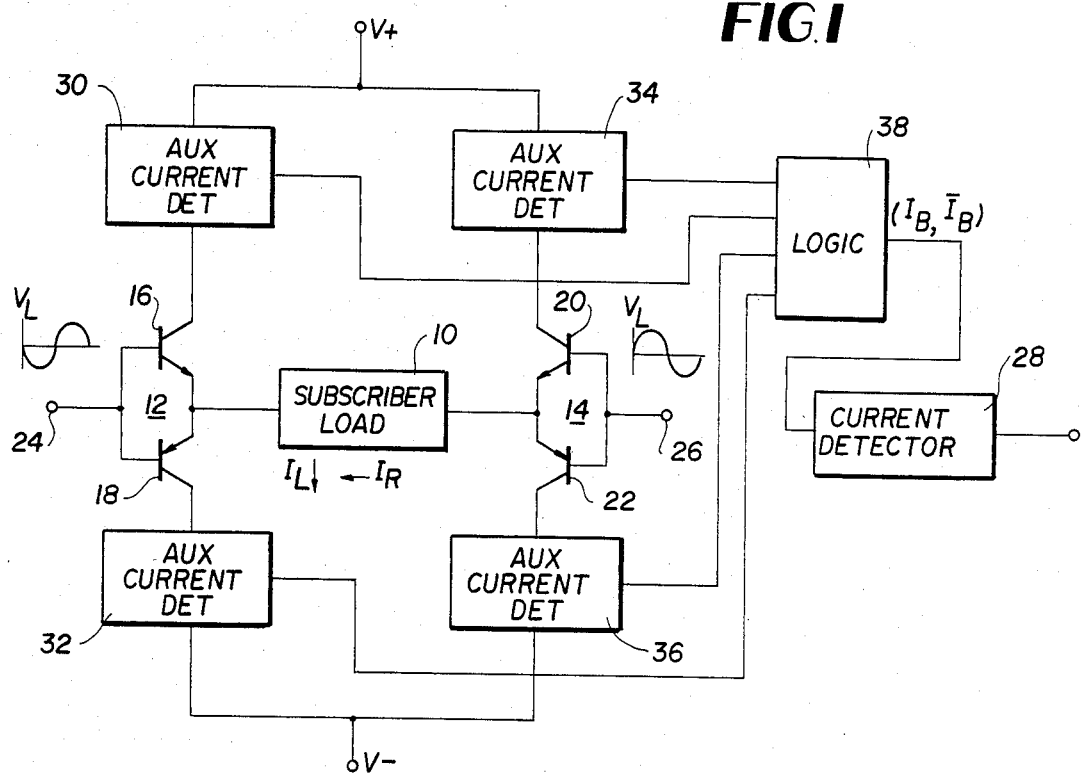
FIG. 1 shows a block diagram of the subscriber line interface circuit (SLIC) of the instant invention.

Referring now to FIG. 1, a subscriber line interface circuit incorporating the instant invention is shown. More specifically, the basic interface circuit comprises the subscriber load 10 connected across parallel class B push-pull amplifiers 12 and 14 each having a complementary symmetry. In particular, amplifier 12 comprises npn transistor 16 and pnp transistor 18 while amplifier 14 comprises npn transistor 20 and pnp transistor 22. The subscriber line is connected to the interface circuit via the terminals 24 and 26. As seen in FIG. 1, the line voltages $V_L$ applied to terminals 24 and 26 are out-of-phase by 180 electrical degrees. The SLIC also includes a current detector 28 which is used to detect the subscriber going off-hook durin ringing. This detector can detect the loop current accurately but only if its direction is known. A simple detection of the line voltage at terminals 24 and 26 will not give the proper polarity of the loop current since the distributed capacitance on the line and inductance of the ringer causes a phase difference between the voltage and current waveforms.

In accordance with the present invention, FIG. 1 discloses the use of a plurality of auxiliary current detectors 30, 32, 34 and 36 which are used to provide a logic circuit 38 with current flow information. In particular, auxiliary current detectors 30, 32, 32 and 36 are placed in each leg of the prior art SLIC structure to sense the magnitude and direction of the loop current $I_R$ and the longitudinal current $I_L$. The information obtained by the auxiliary current detectors 30, 32, 34 and 36 is utilized by the logic circuit 38 to control the mode of the directional current detector 28. In operation, the logic circuit 38 produces a logic high output $I_B$ if the loop current $I_R$ has a positively polarity. Conversely, when the loop current $I_R$ is negative, the logic circuit provides a logic low output $\bar{I}_B$.

These directionality outputs are then used to control the mode of the directional current detector 28. The circuit, therefore, responds to any loop current reversals whether they be normal battery current flow, reverse flow, or A.C. ringing currents. The current detector 28, once placed in the proper directional mode by the operation of the auxiliary current detectors 30, 32, 34 and 36 and the logic circuit 38, also suppresses the longitudinal current $I_L$, as is well-known in the prior art interface circuits. Therefore, the circuit of FIG. 1 effectively provides high common-mode current rejection during ringing. Moreover, the circuit requires no external input, but rather determines the directionality of the loop current $I_R$ from information already presented to the SLIC.

Figure 2:
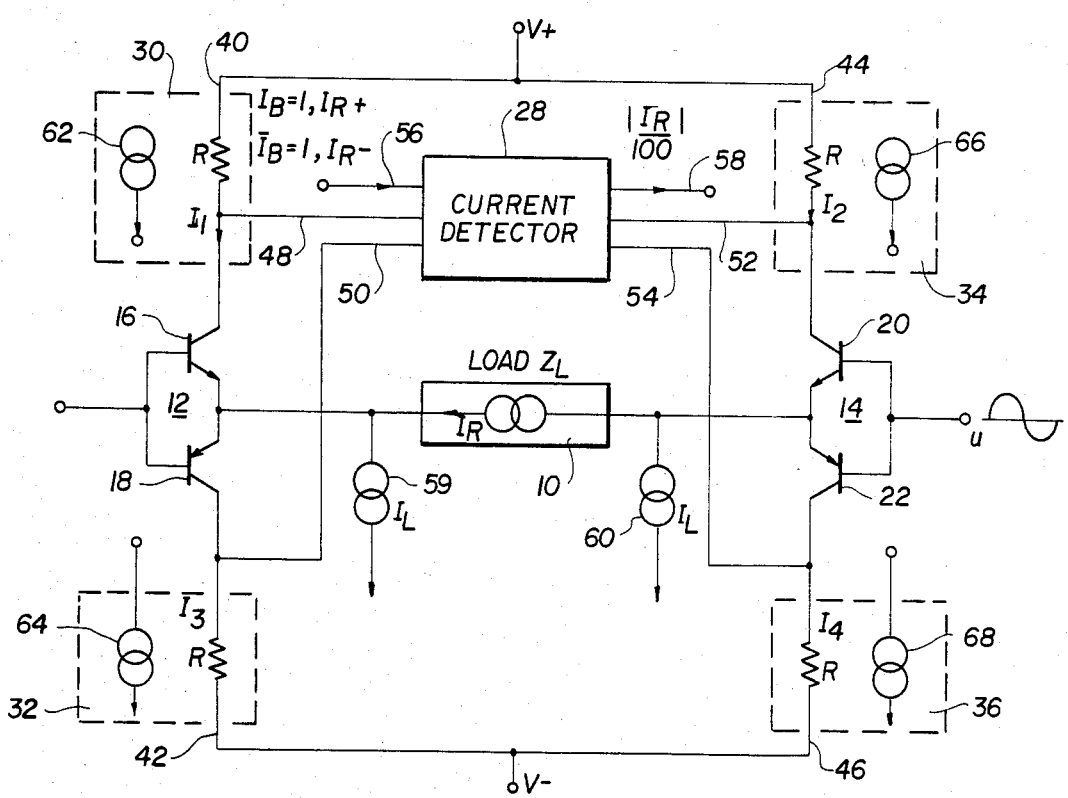
FIG. 2 shows the SLIC of FIG. 1 with details of the auxiliary current detectors which sense the magnitude and direction of the loop and longitudinal currents in the circuit.

FIG. 2 discloses a more detailed schematic of several of the components of the SLIC circuit of FIG. 1. The components of FIG. 1 seen in FIG. 2 are referenced by the same numerals. The logic circuit 38 of FIG. 1 has been omitted from FIG. 2 and will be explained in detail in FIG. 3. Referring now to FIG. 2 in detail, the SLIC is essentially a bridge circuit having legs 40, 42, 44 and 46. Each leg includes a control transistor from one of the parallel class B push-pull amplifiers 12 and 14. More specifically, leg 40 of the bridge is controlled by npn transistor 16, leg 42 by pnp transistor 18, leg 44 by npn transistor 20, and leg 46 by pnp transistor 22. The subscriber load 10 is connected across the bridge output. The currents in the bridge legs are shown as $I_1$, $I_2$, $I_3$ and $I_4$ in FIG. 2.

The directional current detector 28 is connected to each leg of the bridge via the conductors 48, 50, 52 and 54. As seen in FIG. 2, the current detector 28 includes an input terminal 56 for accepting the directionality information ($I_B$ or $\bar{I}_B$) from the logic circuit 38 of FIG. 1. The detector 28 includes an output terminal 58 having an output of $|I_r|/100$. The detector structure which forms no part of the instant invention, suppresses the longitudinal current $I_L$, which is shown in FIG. 2 as current sources 59 and 60.

FIG. 2 also discloses the structure of the auxiliary current detectors 30, 32, 34 and 36 which are used to sense the magnitude and direction of the loop and longitudinal currents to provide the directionality information to the input terminal 56 of the current detector 28. Each of these auxiliary detectors includes a small resistance R in the respective bridge leg. Each auxiliary current detector 30, 32, 34 and 36 produces a sensed current represented diagramatically by the respective current sources 62, 64, 66 and 68. For example, current source 62 in leg 40 of the SLIC senses a current $KI_1$, where K is an attenuation factor and $I_1$ is the current flowing into the collector of npn transistor 16. The currents generated by the sources 64, 66 and 68 are likewise proportional to the collector currents of the transistors 18, 20 and 22.

In accordance with the instant invention, the auxiliary current detectors 30, 32, 34 and 36 are used in conjunction with the logic circuit 38 of FIG. 1 to determine the polarity of the loop current during ringing, this current having an A.C. waveform. This determination allows the directional current detector 38 to be in the proper mode to detect the A.C. ringing current regardless of the magnitude and direction of the longitudinal current. The currents $KI_1$, $KI_2$, $KI_3$ and $KI_4$ produced by the auxiliary current detectors are a function of the loop current $I_R$ and the longitudinal current $I_L$. These relationships can be easily derived:

Where $I_R$ is positive:

| Case I: $I_R > 0$ | | |
|---|---|---|
| Class (a) | $|I_L| < I_R$ | |
| | $I_2 = I_R \pm I_L$ | $I_1 = 0$ |
| | $I_3 = I_R \pm I_L$ | $I_4 = 0$ |
| Class (b) | $|I_L| > I_R, I_L > 0$ | |
| | $I_2 = I_L + I_R$ | $I_3 = 0$ |
| | $I_1 = I_L - I_R$ | $I_4 = 0$ |
| Class (c) | $|I_L| > I_R, I_L < 0$ | |
| | $I_3 = I_L + I_R$ | $I_1 = 0$ |
| | $I_4 = I_L - I_R$ | $I_2 = 0$ |

Similarly, where $I_R$ is negative:

| Case II: $I_R < 0$ | | |
|---|---|---|
| Class (a) | $|I_L| < I_R$ | |
| | $I_1 = I_R \pm I_L$ | $I_2 = 0$ |
| | $I_4 = I_R \pm I_L$ | $I_3 = 0$ |
| Class (b) | $|I_L| > I_R, I_L > 0$ | |
| | $I_1 = I_L + I_R$ | $I_3 = 0$ |
| | $I_2 = I_L - I_R$ | $I_4 = 0$ |
| Class (c) | $|I_L| > I_R, I_L < 0$ | |
| | $I_3 = I_L - I_R$ | $I_1 = 0$ |
| | $I_4 = I_L + I_R$ | $I_2 = 0$ |

Figure 3:
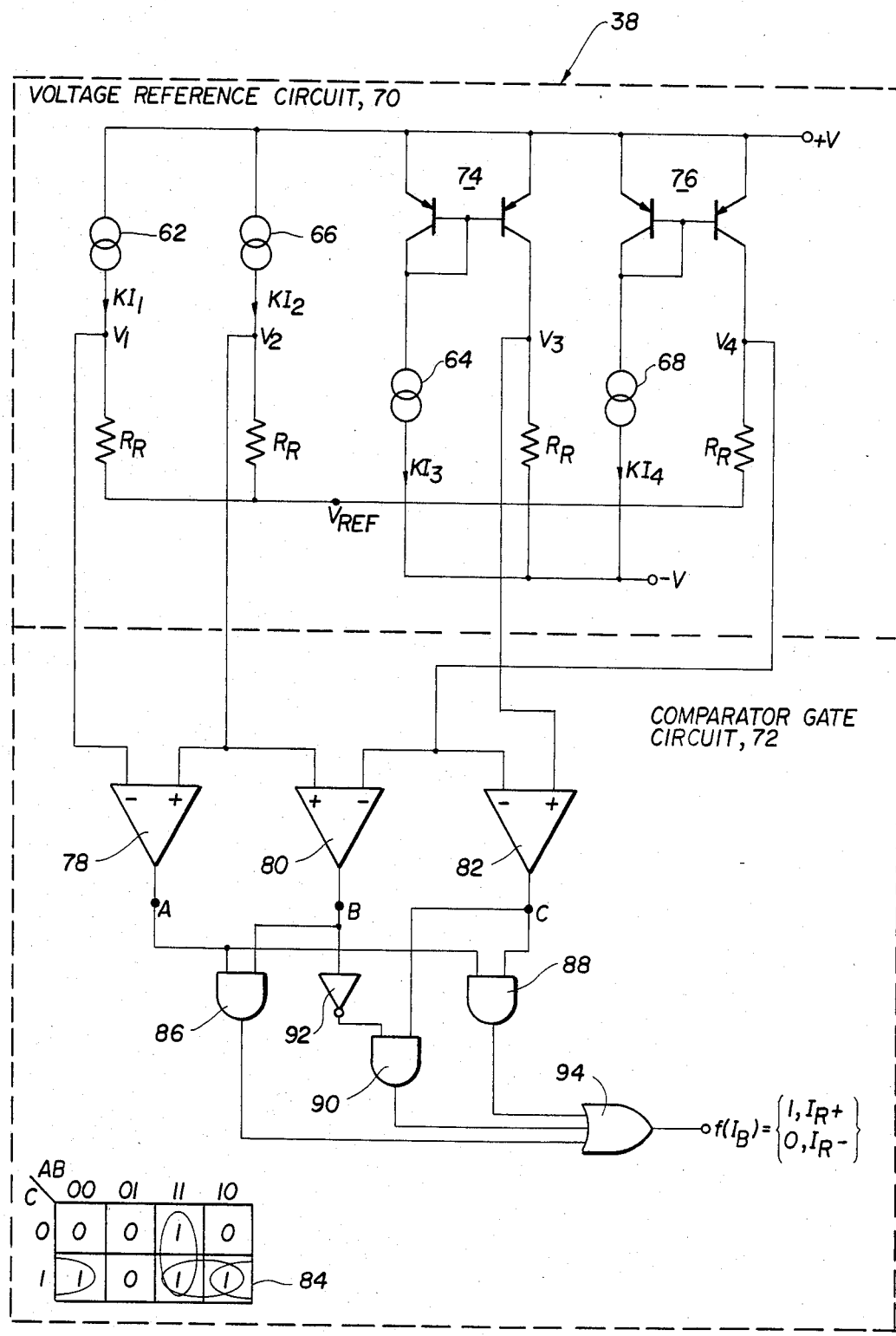
FIG. 3 shows a logic circuit which responds to the auxiliary current detectors to provide directionality information to control the mode of the current detector.

Referring now to FIG. 3, the logic circuit 38 for utilizing the above current flow information is shown in detail. The components of FIG. 2 seen in FIG. 3 are referenced by the same numerals. The logic circuit comprises two distinct portions; a voltage reference circuit 70 and a comparator gate circuit 72. The voltage reference circuit 70 produces four voltages $V_1$, $V_2$, $V_3$ and $V_4$ which are proportional to the four sensed currents $KI_1$, $KI_2$, $KI_3$ and $KI_4$. More specifically, FIG. 3 shows the voltage reference circuit comprising the current sources 62, 64, 66 and 68 of FIG. 2. In addition, the reference circuit includes a plurality of resistances $R_R$ which provide a voltage drop to the reference point $V_{REF}$. Current mirror circuits 74 and 76 are used to form the voltages $V_3$ and $V_4$ from current sources 64 and 68.

As evidenced by the above equalities, the currents $I_1$, $I_2$, $I_3$ and $I_4$ are a function of the loop current and the longitudinal current in the SLIC. These equalities can be transformed into voltage relationships with respect to the voltages $V_1$, $V_2$, $V_3$ and $V_4$. Specifically, where the loop current is positive:

| Case I $I_R > 0$ | |
|---|---|
| Class (a) | $|I_L| < I_R$ |
| | $V_2 > V_1$ |
| | $V_3 > V_4$ |
| | $V_2 > V_4$ |
| | $V_3 > V_1$ |
| | $V_1 = V_4 = 0$ |
| | $V_2, V_3$ have no relationship. |
| Class (b) | $|I_L| > I_R, I_L > 0$ |
| | $V_2 > V_1$ |
| | $V_2 > V_3$ |
| | $V_2 > V_4$ |
| | $V_1 > V_3$ |
| | $V_1 > V_4$ |
| | $V_3 = V_4 = 0$ |
| Class (c) | $|I_L| > I_R, I_L < 0$ |
| | $V_3 > V_4$ |
| | $V_3 > V_1$ |
| | $V_3 > V_2$ |
| | $V_4 > V_1$ |
| | $V_4 > V_2$ |

-continued

| Case I $I_R > 0$ |
| --- |
| $V_1 = V_2 = 0$ |

Similarly, where the loop current is negative:

| | Case II $I_R < 0$ |
| --- | --- |
| Class (a) | $\|I_L\| < I_R$ |
| | $V_2 < V_1$ |
| | $V_3 < V_4$ |
| | $V_2 < V_4$ |
| | $V_3 < V_1$ |
| | $V_2 = V_3 = 0$ |
| | $V_1, V_4$ have no relationship. |
| Class (b) | $\|I_L\| > I_R, I_L > 0$ |
| | $V_2 < V_1$ |
| | $V_2 > V_3$ |
| | $V_2 > V_4$ |
| | $V_1 > V_3$ |
| | $V_1 > V_4$ |
| | $V_3 = V_4 = 0$ |
| Class (c) | $\|I_L\| > I_R, I_L < 0$ |
| | $V_3 < V_4$ |
| | $V_3 > V_1$ |
| | $V_3 > V_2$ |
| | $V_4 > V_1$ |
| | $V_4 > V_2$ |
| | $V_1 = V_2 = 0$ |

Therefore, where $|I_L| > I_R$ and $I_L$ is positive (Class (b)), the directionality of the loop current can be determined by considering the relationship between $V_1$ and $V_2$. Similarly, where $|I_L| > I_R$ and $I_L$ is negative (Class (c)), the directionality of the loop current can be determined by considering the relationship between $V_3$ and $V_4$. Finally, where $|I_L| < I_R$ (Class (a)), the directionality of the loop current can be determined by examining either $V_2$ and $V_4$ or $V_1$ and $V_3$ since $V_2$ and $V_3$ are unrelated for case I as are $V_1$ and $V_4$ for case II.

To determine the proper polarity of the loop current, these classes of voltage relationships are applied to the comparator gate circuit 72. In particular, the comparator gate circuit comprises comparators 78, 80 and 82. To determine the Class (b) polarity the voltages $V_1$ and $V_2$ are applied to the inverting and non-inverting inputs, respectively, of comparator 78. Similarly, the Class (c) polarity is determined by applying the voltages $V_3$ and $V_4$ to the non-inverting and the inverting inputs, respectively, of comparator 82. Finally, using the voltages $V_2$ and $V_4$ as the non-inverting and inverting inputs, respectively, to comparator 80, the Class (a) polarity can be determined. It should be noted that the inputs to comparator 80 could also be the voltages $V_1$ and $V_3$, since a comparison of these voltages will also give the Class (a) polarity.

The outputs A, B and C of the comparators 78, 80 and 82 are therefore related to the voltage relationships as described by the following truth table:

| | A | B | C |
| --- | --- | --- | --- |
| $\|I_L\| < I_R, I_R > 0$ | 1 | 1 | 1 |
| $\|I_L\| > I_R, I_L > 0, I_R > 0$ | 1 | 1 | X |
| $\|I_L\| > I_R, I_L < 0, I_R > 0$ | X | 0 | 1 |
| $\|I_L\| < I_R, I_R < 0$ | 0 | 0 | 0 |
| $\|I_L\| > I_R, I_L > 0, I_R < 0$ | 0 | 1 | X |
| $\|I_L\| > I_R, I_L < 0, I_R < 0$ | X | 0 | 0 |

This truth table can be minimized using the Karnaugh map 84 seen in FIG. 3 to derive the directionality function $f(I_B)$. In particular this function is:

$$f(I_B) = AB + AC + \bar{B}C$$

Referring again to FIG. 3, the directionality function is implemented by the comparator gate circuit. Specifically, AND gates 86, 88, 90, inverter 92, and OR gate 94 are provided to derive the directionality information. The output of OR gate 94, which is a logic high if the loop current is positive and a logic low if the loop current is negative, is applied to the input terminal 56 of the current detector 28 of FIG. 2. This directionality information insures that the directional detector is always in the proper detection mode.

It can be seen therefore than an improved SLIC has been provided wherein the current detector responds to all true loop current reversals whether normal battery current flow, reverse flow, or A.C. ringing currents. The mode of the current detector is controlled internally by sensing the loop and longitudinal currents in the SLIC. Since the detector also suppresses the longitudinal current, the SLIC of the present invention exhibits high common-mode current rejection during ringing.

From the following description of the preferred embodiments it is evident that the objects of the invention are attained. Although the invention has been described and illustrated in detail, it is clearly understood that the same is by way of example and illustration only and is not to be taken by way of limitation. The spirit and scope of the present invention are to be limited only by the terms of the appended claims.

What is claimed is:

1. A subscriber line interface circuit for connecting a subscriber's telephone line to a telephone exchange having high common-mode currents, comprising:
   two identical amplifiers, each having an output coupled to a respective wire of said telephone line and an input connected to said telephone exchange, said amplifiers connected in parallel to form a bridge circuit;
   a directional current detector means coupled to said bridge circuit for detecting loop current in said circuit and for suppressing said common-mode currents as a function of the direction of loop current;
   a plurality of auxiliary current detector means within said bridge circuit for sensing loop and common-mode currents; and
   a control circuit means connected to said auxiliary current detector means and said directional current detector means for determining the polarity of said loop current and placing said direction current detector means in a proper directional mode for detecting said loop current.

2. A subscriber line interface circuit as defined in claim 1, wherein each of said auxiliary current detector means includes a resistor in the respective leg of said bridge circuit and a current source means for generating a current proportional to the current in said leg.

3. A subscriber line interface circuit as defined in claim 2, wherein each of said current source means generate a current which is a function of said loop common-mode currents in said bridge circuit.

4. A subscriber line interface circuit as defined in claim 3, wherein said control circuit means includes a voltage reference circuit for producing a plurality of voltages proportional to said currents generated by each of said auxiliary current detector means.

5. A subscriber line interface circuit as defined in claim 4, wherein said control circuit means further includes a comparator gate circuit means for utilizing said plurality of voltages produced by said voltage reference circuit to determine said polarity of said loop current.

6. A subscriber line interface circuit as defined in claim 5, wherein said comparator gate circuit means has an output applied to said directional current detector means for controlling said directional mode of said directional current detector means.

7. A subscriber line interface circuit according to claim 1 wherein said control circuit means includes a comparator means for comparing said currents sensed by said plurality of auxiliary current detector means and producing a directional mode control signal representing loop current polarity as a function of said comparing.

8. A method for detecting loop current polarity in a subscriber line interface circuit including a bridge circuit and a directional current detector for detecting the loop current and for suppressing common-mode current comprising the steps of:

sensing a current in each leg of said bridge circuit, said current being a function of loop and common-mode currents;

forming a plurality of voltages proportional to said sensed currents;

utilizing said plurality of voltages to determine loop current polarity; and utilizing said determined loop current polarity to control the directional mode of said directional current detector for detecting said loop current and suppressing common-mode current.

* * * * *